Oct. 7, 1958      E. J. QUINBY      2,855,585

DIAL READING DEVICE

Filed Nov. 30, 1953      4 Sheets-Sheet 1

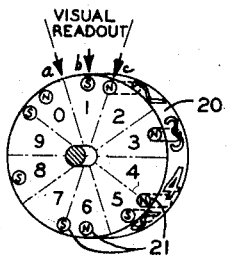

| NUMERAL DISPLAYED | CODE POSITION | | |
|---|---|---|---|
| | a | b | c |
| 0 | S | N | NIL |
| 1 | NIL | S | N |
| 2 | N | NIL | NIL |
| 3 | NIL | N | NIL |
| 4 | NIL | NIL | N |
| 5 | N | S | NIL |
| 6 | NIL | N | S |
| 7 | S | NIL | NIL |
| 8 | NIL | S | NIL |
| 9 | NIL | NIL | S |

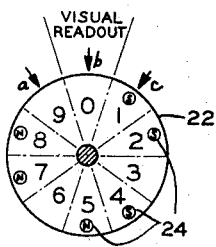

| NUMERAL DISPLAYED | CODE POSITION | | |
|---|---|---|---|
| | a | b | c |
| 0 | NIL | NIL | S |
| 1 | NIL | S | S |
| 2 | S | S | NIL |
| 3 | S | NIL | S |
| 4 | NIL | S | N |
| 5 | S | N | NIL |
| 6 | N | NIL | N |
| 7 | NIL | N | N |
| 8 | N | N | NIL |
| 9 | N | NIL | NIL |

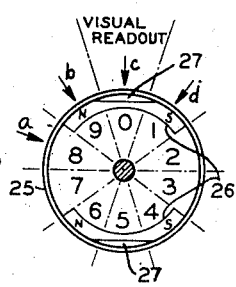

| NUMERAL DISPLAYED | CODE POSITION | | | |
|---|---|---|---|---|
| | a | b | c | d |
| 0 | NIL | N | NIL | S |
| 1 | N | NIL | S | NIL |
| 2 | NIL | S | NIL | NIL |
| 3 | S | NIL | NIL | S |
| 4 | NIL | NIL | S | NIL |
| 5 | NIL | S | NIL | N |
| 6 | S | NIL | N | NIL |
| 7 | NIL | N | NIL | NIL |
| 8 | N | NIL | NIL | N |
| 9 | NIL | NIL | N | NIL |

INVENTOR.
EDWIN J. QUINBY
BY *William F. Glover*

AGENT

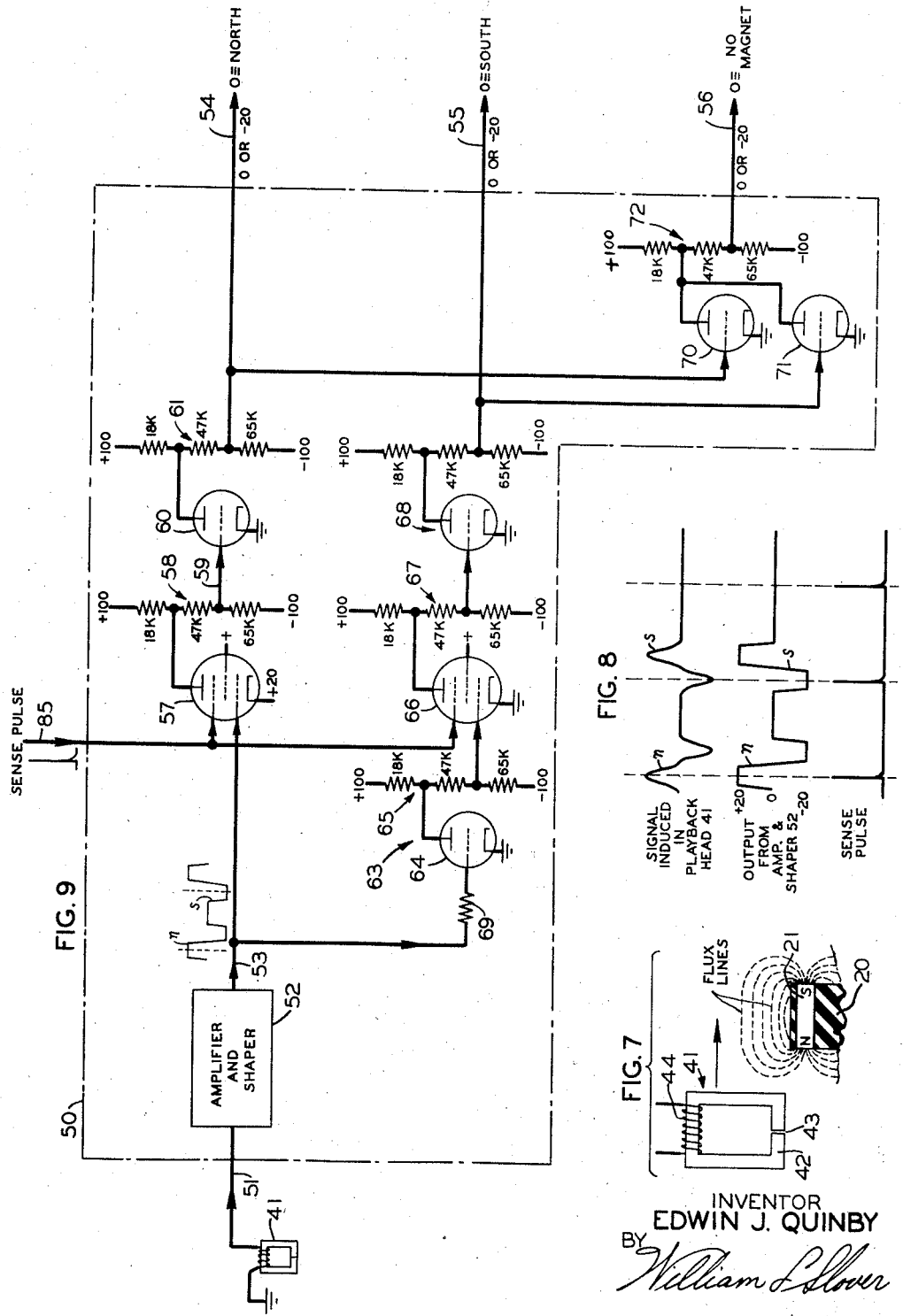

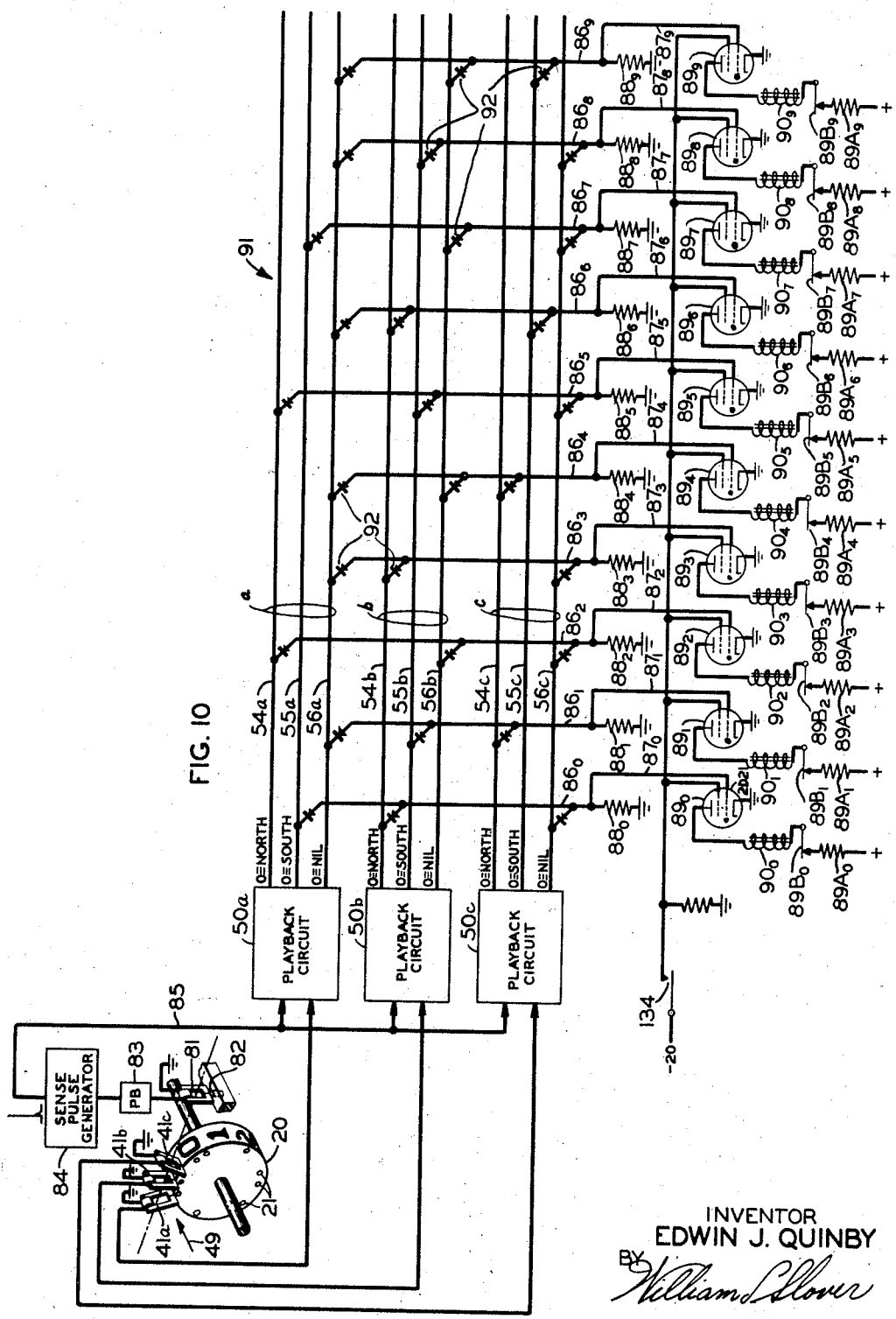

Oct. 7, 1958 E. J. QUINBY 2,855,585
DIAL READING DEVICE
Filed Nov. 30, 1953 4 Sheets-Sheet 4
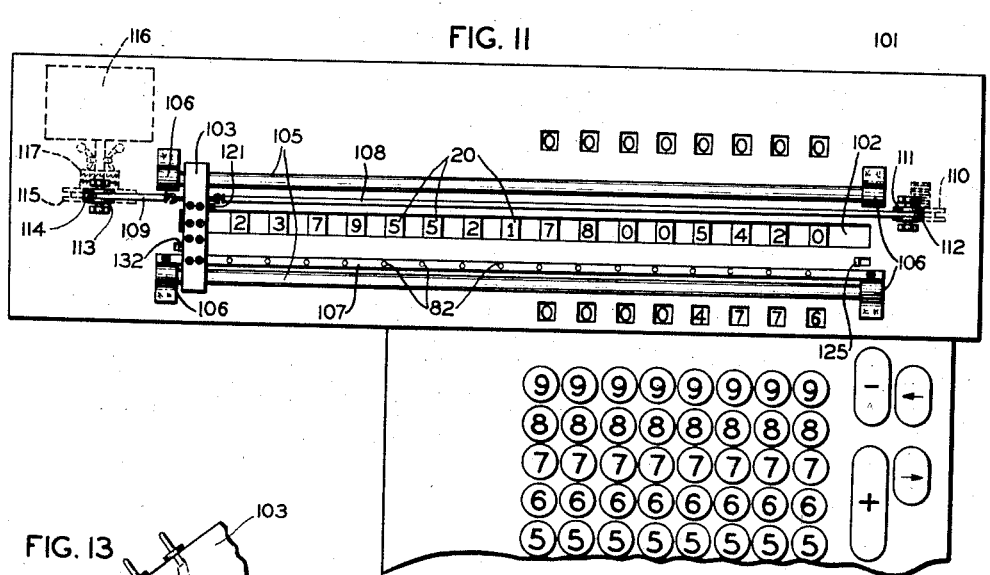
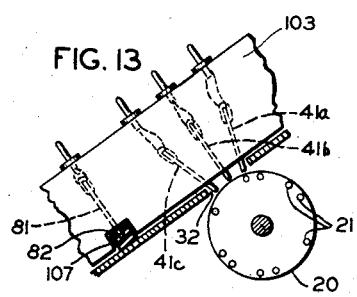
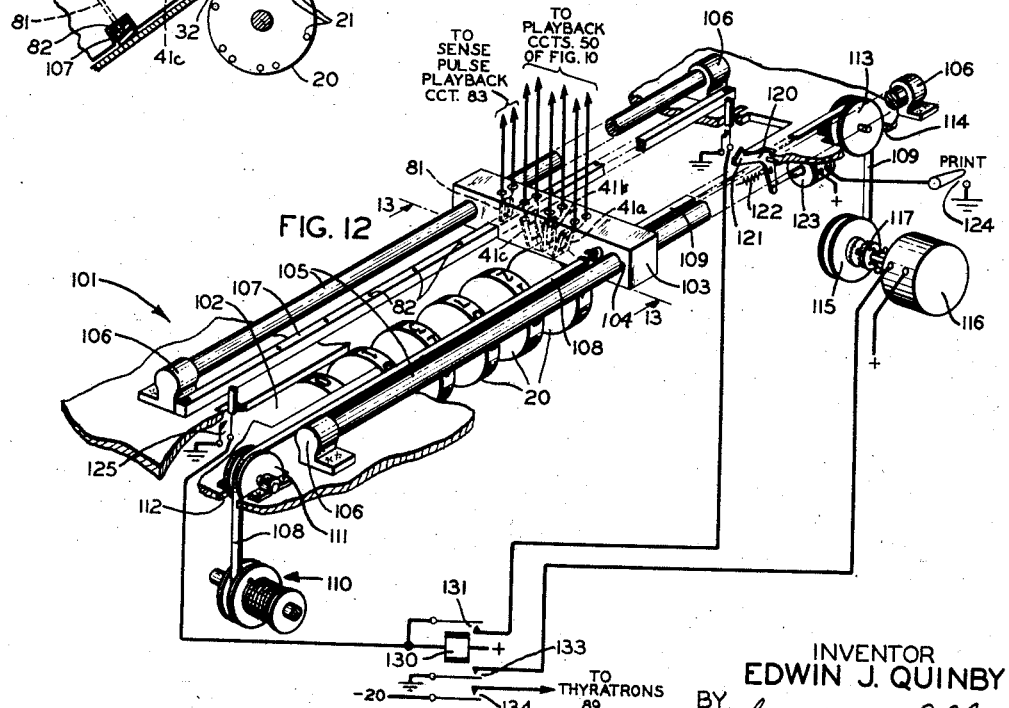
INVENTOR
EDWIN J. QUINBY
BY
AGENT

United States Patent Office 2,855,585
Patented Oct. 7, 1958

2,855,585
DIAL READING DEVICE

Edwin J. Quinby, Summit, N. J., assignor to Monroe Calculating Machine Company, Orange, N. J., a corporation of Delaware Application November 30, 1953, Serial No. 395,008

10 Claims. (Cl. 340—174)

This invention relates to means for controlling printing or other display means differentially in accordance with the settings of one or more remotely located indicator dials or the like.

Many calculating machines and the like are known which do not include means for printing the results of computations performed thereon but rather, display the results on one or more indicator dials. These machines are extremely useful and highly efficient where no printed or other permanent record of the results of the calculations performed thereon is required. However, where a permanent record is required it becomes necessary for a typist or the like, to read the indicator dials and then type or otherwise record the number displayed thereby, an operation which is not only time consuming but which also increases the possibility of a human error entering into the system. To overcome this deficiency, it has been proposed to connect printing or other recording means to the indicator dials.

The indicator dials in certain known machines are so embedded in mazes of mechanism that it is impossible, or at least extremely difficult to mechanically connect printing or other recording means thereto without resorting to one or the other of the extremely undesirable expedients of defacing the dials or blocking visual access thereto. Further, it has been found that the indicator dials in some machines are driven by mechanism which is of such delicate nature that additional mechanical loads cannot be safely placed thereon.

The principal object of the invention, therefore, is the provision of means for controlling printing or other display means differentially in accordance with the settings of one or more indicator dials or the like, which means place no objectionable mechanical load on the dials, do not require defacing thereof, and do not block visual access thereto.

According to the invention, means are provided for producing differentially polarized magnetic fields surrounding each of one or more of a plurality of code positions associated with each of the sectors of a dial which the latter may be set to display. A plurality of reading heads are provided, one for each of the code positions for a sector, and also means for effecting relative movement between said reading heads and the code positions associated with the sector being displayed by each of one or more dials. Each reading head controls a playback circuit which is enabled by suitably produced synchronizing pulses to identify the type of signals produced by the reading heads. The outputs of the playback circuits control a matrix which, in turn, produces suitable signals on output lines representative of the settings of the dials.

Other objects and features of the invention will become apparent from the following description when read in the light of the drawings of which:

Fig. 1 is a perspective, somewhat diagrammatic, view of an indicator dial constructed and arranged in accordance with a preferred form of the invention, to be read both visually and magnetically.

Fig. 2 is a chart which illustrates the code used in connection with reading the dial of Fig. 1 magnetically.

Fig. 3 is a side elevation of an indicator dial similar to that shown in Fig. 1 but arranged to be read magnetically in accordance with another code.

Fig. 4 is a chart which illustrates the code utilized in connection with reading the dials of Fig. 3 magnetically.

Fig. 5 is a side elevation of an indicator dial similar to that shown in Fig. 1 but constructed in accordance with another form of the invention and arranged to be read magnetically in accordance with another code.

Fig. 6 is a chart which illustrates the code which is utilized in connection with reading the dial of Fig. 5 magnetically.

Fig. 7 is a diagrammatic view which illustrates the co-operation between a magnetic reading head and a magnet contained in the dial illustrated in Fig. 1.

Fig. 8 is a pulse chart which illustrates the wave forms obtained at various points in the circuit of the invention.

Fig. 9 is a wiring diagram of a playback circuit utilized in the means of the invention.

Fig. 10 is a wiring diagram of the means of the invention which includes, by means of block diagrams, three circuits of the sort shown in Fig. 9.

Fig. 11 is a perspective plan view of a calculating machine having the means of the invention applied thereto.

Fig. 12 is a fragmentary perspective view, with some parts shown diagrammatically, of the means of the invention as applied to the calculator shown in Fig. 11, with the view being taken from above and to the rear, right of the calculator.

Fig. 13 is a fragmentary sectional view taken on line 13—13 of Fig. 12.

Magnetic coding of dials

According to the preferred form of the invention illustrated in Fig. 1 each digital sector of an indicator dial 20 constructed of non-magnetic material (for example, a suitable plastic) is provided with three code positions, *a*, *b*, and *c*, of which *a* and *c* are located at the angular extremities of the sector and *b* is located at the center thereof. Evidently the code positions *a* and *c* for each digital sector also comprise the code positions *c* and *a* respectively for the next lower and the next higher digital sectors.

Embedded beneath the peripheral surface of the dial 20 at various of the positions *a*, *b*, and *c*, in parallel relation to the axis of the dial are a plurality of magnetized rods or bar magnets 21. Preferably the magnets 21 are placed in accordance with the ternary code illustrated in Fig. 2 which utilizes the presence or absence of a magnet in each code position *a*, *b*, and *c* as well as the polarity thereof with respect to a datum-position located laterally of the dial, to define each digital sector of the dial. For example, the sector of dial 20 appropriate to the digit 5 is not provided with a magnet 21 at position *c* but is provided with magnets at positions *a* and *b* which are polarized south and north respectively, relative to the aforementioned datum position.

One advantage of the arrangement illustrated in Fig. 1 is that the magnetic identifying media for each digital sector of the dial are contained within the said sector. This, of course, makes it possible to contain whatever means are used to sense the position of the dial within radial extensions of the angular confines of the sector.

In some instances it may not be important to confine the magnetic identifying media for each dial sector and the sensing means therefor within the angular extremities of the sector, but rather it may be advantageous to minimize the number of bar magnets which are required to define all of the dial sectors. To this end, the means shown in Figs. 3 and 4 are provided. As shown, three code positions, a, b, and c which are used to identify each dial sector are located at the angular centers of the said dial sector and of the next lower and higher digital dial sectors, position a being associated with the next lower dial sector and position c being associated with the next higher dial sector. For convenience of description the dial is referenced 22 in Fig. 3 and the bar magnets embedded beneath the periphery thereof are designated 24. The dial and the magnets, however, may be of exactly the same sort as described above in connection with Fig. 1, wherein they are designated 20 and 21 respectively. Referring particularly to Fig. 4, it will be noted that only six magnets 24 are required to identify the ten digital sectors of dial 22 rather than ten magnets as required in the arrangement of Fig. 1.

According to another form of the invention, the bar magnets 24 and 21 may be replaced by a pair of arcuately shaped magnets 26 mounted at or near the peripheral surface of the dial which is designated 25 in Fig. 5. As shown, each magnet 26 extends angularly throughout three dial sectors, in the present instance, the 9, 0 and 1 sectors or the 6, 5 and 4 sectors. The outer surface of each of the magnets 26 is milled away at its center, as indicated at 27, sufficiently to prevent the flux surrounding the magnet at this point from exerting any magnetic influence beyond the periphery of the dial.

In this form of the invention, four sensing positions, a, b, c, and d, located at the centers of four successive dial sectors, are utilized. The code whereby the several sectors of the dial are identified by the magnetic conditions present at the said four positions, is shown in Fig. 6.

In Figs. 1, 3, and 5, the magnets 21, 24, and 26 are so arranged that when a particular dial sector is at the visual readout position, the code positions which identify that sector are also located at or about said readout position. However, if desired, the code positions for each dial sector need not be so located but may be located in physical association with some other dial sector so as to be properly positioned for cooperation with suitable sensing means when the sector identified thereby is at the visual readout position.

It will be seen, therefore, that an indicator dial can be modified in any of a plurality of ways to enable it to indicate its setting magnetically as well as visually. In order to "read" the magnetic indications of a dial's setting, a magnetic reading head may be provided for each of the code positions which are used in the indicating code.

*Means for sensing the magnetic aspect of each code position of a dial*

A suitable magnetic reading head 41 is shown in Fig. 7 and comprises a magnetic core 42 having an air gap 43 therein, and a coil 44 wound on the core. In well known manner a relative movement between the reading head 41 and a magnet, such as one of the magnets 21 of Fig. 1, which causes the magnetic field surrounding the magnet to be cut by the reading head, results in the induction of a voltage in the winding 44 of the head. If the relative movement between the head and the magnet is such that the head completely bypasses the magnet from one pole to the other, then a substantially sinusoidal voltage is induced in the winding 44, the first half cycle as the gap 43 of the head passes from one pole of the magnet to the center thereof and the second half cycle as said gap passes from the center to the other pole of the magnet. For example, as the head 41 shown in Fig. 7, passes by the magnet 21 embedded in dial 20, with its north pole positioned to effect the reading head first, a sinusoidal signal is induced in the winding 44 of which the first half cycle is positive and the second half cycle negative as indicated at n in Fig. 8. Conversely, the first half cycle of the signal is negative and the last half cycle positive as indicated at s in Fig. 8, if the playback head is moved through a magnetic field of the opposite direction, that is, past the south pole of a magnet prior to the north pole. It is assumed, of course, that the relative movement between the magnet and the reading head is at a sufficiently rapid rate and that the head passes as close to the peripheral surface of the dial as is practicable, in order to obtain a satisfactory signal.

Obviously, no signal is induced in the coil of a reading head 41 when it is moved past a dial code position not provided with a magnet 21. Therefore, the means thus far described are capable of producing three electrical conditions corresponding to the three magnetic conditions which may exist at each code position of a dial, namely, either of two electrical signals or no electrical signal.

A study of the signals n and s of Fig. 8 reveals that it is only necessary to look at the first half cycles thereof to differentiate between them; that is, a positive first half cycle indicates that the north pole of a magnet was sensed first, while a negative first half cycle indicates that the south pole of a magnet was sensed first. This, in effect, amounts to sensing only one pole of a magnet. Hereinafter, the sensing of each magnet by a reading head will be referred to as sensing of a north pole or a south pole depending on the orientation of the magnet's poles relative to the path of travel of the reading head; that is, according to which pole is positioned to cooperate with the reading head first.

The signals generated in a reading head 41 are transmitted over a line 51 to a reading or playback circuit 50 (Fig. 9) which is also controlled by sharp, positively directed sense pulses which, as will be more fully described hereinafter, occur in coincidence with the peak of the first half cycle of each said signal. The playback circuit amplifies the said signals, detects the identity thereof under control of the sense pulses, and produces a suitable output potential on one of three output lines 54, 55, and 56 of which the first is assigned to indicating the sensing of a north pole, the second, the sensing of a south pole and the third, the absence of a magnet at a code position, i. e., no signal from a reading head 41 on the occurrence of a sense pulse.

The line 51 is applied to the amplifying and clipping section 52 of playback circuit 50 (Fig. 9) wherein the substantially sinusoidal signals induced in head 41 are amplified and clipped in known manner for application to an output line 53 of the section in the form of square wave pulses which may rise and fall from a quiescent 0 volt level to levels of approximately +20 and −20 volts.

Output line 53 is applied to the control grid of a pentode coincidence detector 57 whose cathode is connected to a source of +20 volt potential and whose screen grid is connected to a source of suitable positive potential. The sense pulses referred to above are applied to the second control grid (suppressor grid) of pentode 57 over a line 85. The arrangement is such that pentode 57 conducts if and only if a high potential of approximately +20 volts is applied to its control grid over line 53 to indicate the sensing of a north pole in coincidence with the application of a sense pulse to its second control grid. At all other times the pentode is cut off.

The anode of pentode 57 is connected to the juncture of the two positivemost sections of a three section voltage divider 58 which is connected across a direct current source of + and −100 volts. The positive end of the most negative section of the voltage divider provides a center tap which, utilizing the component values indicated, assumes potentials of approximately zero and −20 volts when pentode 57 is cut off and conducting, respectively. An output line 59 extended from the center tap of voltage divider 58 is applied to the control grid of a triode 60 whose cathode is connected to ground potential and whose anode is connected to a voltage divider 61 which is identical with the voltage divider 58. Triode 60 and its voltage divider 61 comprise an inverter which produces output potentials of zero and −20 volts on application thereto of −20 and zero volt potentials, respectively. The output of the inverter is applied to the output line 54 of the playback circuit.

It will be seen, therefore, that if a +20 volt potential which indicates the sensing of a north pole is applied to pentode 57 in coincidence with a sense pulse, the pentode 57 conducts and cuts off triode 60 which, in turn, effects application of a zero volt potential to output line 54. However, if a zero or −20 volt potential is applied to the pentode, the former to indicate the absence of a magnet in a code position and the latter to indicate the sensing of a south pole, the pentode does not conduct on the occurrence of a sense pulse but maintains triode 60 conducting and output line 54 at a potential of −20 volts.

The output line 53 of amplifier and shaper 52 is also connected to an inverter 63 comprising a triode 64 and a voltage divider 65, whose output, in turn, is applied to a pentode coincidence detector 66 identical with the pentode 57 and having the sense pulses applied thereto the same as the latter. A current limiting resistor 69 is connected in the grid circuit of triode 64 to prevent excessive grid current flow when the output line 53 assumes a potential of +20 volts. Inverter 63 serves to apply a high potential of zero volts to pentode 66 only when output line 53 of amplifier and shaper 52 assumes a −20 volt potential which, when it occurs coincidentally with a sense pulse, indicates the sensing of a south pole. Zero and +20 volt potentials on line 53 cause the inverter to apply a −20 volt potential to the pentode.

Evidently therefore, pentode 66 conducts only on coincident application thereto of a sense pulse and a high-potential from inverter 63 which indicates sensing of a south pole. The anode of pentode 66 is connected to a voltage divider 67, identical with divider 58, whose output is applied to an inverter 68 which is cut off only when the pentode conducts. The output of inverter 68 comprises the output line 55 of the playback circuit which, it will readily be seen, assumes a high potential of zero volts to indicate the sensing of a south pole and a low potential of −20 volts under all other operating conditions.

In order for output line 56 of the playback circuit to assume a high potential to indicate the absence of a magnet at a code position, the same is extended from a voltage divider 72 identical with those described hereinabove, to which the anodes of a pair of triodes 70 and 71 are connected. The cathodes of triodes 70 and 71 are connected to ground potential and their grids are connected to the output lines 54 and 55 of the playback circuit, respectively.

The arrangement is such that whenever one of the output lines 54 or 55 assumes a high potential to indicate the sensing of one pole or another of a magnet, one of the triodes 70 or 71 conducts and lowers the potential of output line 56 to approximately −20 volts. At all other times, however, output line 56 is maintained at a high potential of zero volts to indicate the absence of a magnet in a code position.

It will be noted that, since output lines 54 and 55 can assume the high potential of zero volts only during the span of a sense pulse, the output line 56 assumes a high potential not only when both of said lines fail to assume a high potential at that time, but also for substantially the entire interval between sense pulses. This condition does not give rise to complications unless a code representation is used which calls for the absence of magnets in all three code positions for a dial sector. This representation is not used in the illustrated instance of the invention (Fig. 2). However, if it is desired to use this code representation, the condition can be eliminated by connecting the output line 56 to a pentode coincidence detector identical with pentode 57, along with the sense pulses, and applying the output of the detector to an inverter which will produce a high potential of zero volts to indicate the absence of a magnet in a code position, only during the span of a sense pulse.

*Means for producing sense pulses and means for correlating the sensings of the code positions of a dial*

The means for producing the sense pulses will now be described. Referring to Fig. 10, the three code positions $a$, $b$, and $c$ associated with the digit displayed by a dial 20 of the sort illustrated in Fig. 1, are sensed by reading heads $41_a$, $41_b$, and $41_c$ moved rapidly across the dial surface of said positions in the direction of arrow 49. A fourth reading head 81, whose function it is to initiate the generation of the sense pulses is moved parallel to and in fixed relationship with the three reading heads 41, and passes in close proximity to a magnetized spot or bar magnet 82 located in fixed position relative to the dial. The signal induced in reading head 81 as it passes in close proximity to said magnet 82 is applied to a playback circuit 83 which drives a sense pulse generator 84 of any suitable sort adapted to produce sharp, accurately timed, positively directed pulses. The sense pulses produced by generator 84 are applied via line 85 to three playback circuits $50_a$, $50_b$, and $50_c$ controlled by the reading heads $41_a$, $41_b$, and $41_c$. The magnet 82 is so positioned with respect to the dial that each sense pulse occurs at substantially the peaks of the first half cycles of the sinusoidal signals induced in the reading heads 41 (Fig. 8).

The means thus far described are capable of sensing the magnetic aspect at a code position of a dial sector and of producing three outputs from the playback circuit 50 associated with said position. In order to correlate the nine outputs of the three playback circuits $50_a$, $50_b$, and $50_c$ and effect selective operation of a plurality of dial-setting, simulating means in accordance therewith, a rectifier matrix 91 is provided. Specifically it is desired in the present instance, to effect energization of that one of ten solenoids $90_0$–$90_9$ which is assigned to the digit displayed by the dial and which may effect printing of that digit in an electric typewriter or the like. Each of ten lines $86_0$–$86_9$ is connected to ground potential through a resistor 88, and to one output line 54, 55, or 56 of each of the playback circuits $50_a$, $50_b$, and $50_c$ through rectifiers 92, in accordance with the code illustrated in Fig. 2. The anodes of the rectifiers 92 which may be of either the vacuum tube or the crystal varieties, are connected to the lines 86.

The arrangement is such that when an output line 54, 55, or 56 is at the low potential of −20 volts, the rectifiers 92 whose cathodes are connected thereto conduct and an IR drop is effected across the resistors 88 which are connected to the anodes of said rectifiers by the lines 86. This, of course, lowers the potentials of said lines 86 to approximately the −20 volt level. Normally, at least one rectifier 92 associated with each line $86_{0-9}$ is conducting so that the normal potential level of all of the lines is approximately −20 volts. However, when the playback circuits $50_a$, $50_b$, and $50_c$ produce outputs representative of a digit displayed by dial 20, the high potential of zero volts is applied to the anodes of all three rectifiers connected to the line 86 appropriate to said digit, and the potential of said line rises to approximately the zero volt level. For example, if the code representation of the digit 3 (Fig. 2) has been sensed by the reading heads 41, the playback circuit output lines $56_a$, $54_b$, and $56_c$ assume the high potential of zero volts while all the other output lines assume the low potential of −20 volts. The only line $86_{0-9}$ which is connected to all three of said output lines $56_a$, $54_b$, and $56_c$ (and to no others) is line $86_3$. Therefore this is the only line 86 whose potential level is raised to approximately zero volts.

In order to energize the solenoids 90 under control of the short, positively directed pulses appearing on the lines $86_{0-9}$, each of said lines is connected via a conductor 87 to the control grid of a thyratron 89 adapted to operate the solenoid $90_{0-9}$ appropriate to said line. Preferably the thyratrons are of the type 2D21 and have their cathodes connected to ground and their anodes connected to a source of positive potential (B+) through the windings of the solenoids and suitable resistors 89A. The second grids of the thyratrons are connected to ground potential in a manner to be more fully described hereinafter.

The arrangement is such that when the potential level of a line $86_{0-9}$ is raised to zero volts the associated thyratron is fired to energize the appropriate solenoid 90.

In order to quench the thyratrons after they have been fired and have performed their function, each solenoid 90 is provided with interrupter contacts 89B through which its winding is connected to the positive potential source, and which are opened by the armature of the solenoid when the same has been moved sufficiently to perform its mechanical function, i. e., actuation of a type bar or the like. Opening of the interrupter contacts disconnects the positive potential source from the anode of the associated thyratron and the latter is quenched.

It is to be mentioned that, if desired, other known means may be provided to operate the solenoids.

It will be seen therefore, that the means thus far described are capable of performing the magnetic and electrical functions required to operate printing means, or the like, differentially in accordance with the setting of an indicator dial.

Physical realization of the invention

The mechanical means for effecting relative movement between the magnetic reading heads 41 and the dial or dials associated therewith may be of any suitable sort. One form of such means which is capable of moving the reading heads 41 and 81 across a plurality of dials embodied in the carriage of a mechanical calculating machine is illustrated in Figs. 11-13. As shown in said figures, the reading heads 41 and 81 are embedded in a rectangular block 103 of non-magnetic material, preferably a suitable light-weight plastic, provided with a lateral bore 104 near either end by which the same is slidably mounted on a pair of guide rods 105. The guide rods 105 are secured by means of end brackets 106 to the carriage cover 101 of the calculating machine, one on either side of a long transverse slot 102 in said carriage through which a series of dials 20 settable to represent the results of calculations performed on the machine, may be read visually or magnetically. The underface of block 103 is provided with a laterally extending groove immediately adjacent the sense pulse reading head 81, to accommodate a bar 107 which is secured to the carriage cover 101 immediately behind the forward rod 105. The sense pulse magnets 82 are embedded in the bar 107, each in position to cooperate with the reading head 81 at the proper time with respect to the signals induced in the reading heads 41 under control of magnets 21 embedded in the dial 20 associated with said magnet 82.

Block 103 and the reading heads 41 and 81 carried thereby are moved from their normal positions at the left hand end of the calculator carriage across the dials 20 to effect sensing of the digital positions thereof seriatim, by a tape 108, and are returned to their normal positions by a tape 109. Tape 108 is secured to block 103 by any suitable means, for example, a hookeye, and is passed over a pulley 111 secured to carriage cover 101 and through a slot 112 in the latter to a tape reel 110 located in the right hand end of the carriage. Preferably reel 110 is of the spring operated type normally used in typewriters and the like. Tape 109 is likewise secured to block 103 and is passed over a pulley 113 and through a slot 114 to a tape reel 115 located in the left hand end of the carriage. Tape reel 115 is operated by an electric motor 116 through the medium of a centrifugal clutch 117. Normally clutch 117 is disengaged, but operation of the electric motor engages the same and effects rotation of reel 115. At this point it is worth while mentioning that in applying the means of the invention to an existing calculator, for example, the one shown in Patent 2,531,207 to H. Gang, it may be necessary to elongate the carriage cover thereof to accommodate the reels 110 and 115 and the motor 116, and to modify the contours thereof in other respects to facilitate the mounting and operation of the reading head carrier (block 103) whose shape may also be altered as required. These details of design form no part of the invention, however, and will not be described further herein.

In order to retain block 103 in its normal position at the left hand end of the calculator carriage a latch 120 is provided which comprises a suitably pivoted bell crank having one arm urged outwardly through a slot in carriage cover 101 by a spring 122. This outwardly urged arm is provided with a hooknose 121 by which the arm is cammed downward into the slot by the block 103 as the latter is returned to normal position by the tape 109, and which springs up behind the block to lock it in said position against the tension exerted thereon by tape 108. Latch 120 is tripped by a solenoid 123 whose armature is connected to the depending arm of the latch. A switch 124 which is operated (closed) whenever it is desired to effect printing of a number set up in the dials 20 is connected in circuit with the solenoid and a source of energizing current in such manner that the solenoid is energized to trip the latch on closure thereof.

In order to effect restoration of the block 103 to its normal position after it has traversed the dials 20 and has been arrested by the end brackets 106 at the right hand ends of the guide rods 105, the armature of a suitable, normally open, switch 125 is projected through an opening in carriage cover 101, in position to be engaged by said block to close the switch after the block has passed the lowest order dial 20 and before it has come into contact with the end brackets 106. Closure of switch 125 provides ground return for a relay 130 which becomes energized and is maintained energized by a holding circuit which extends through contacts 131 of the relay and a normally closed switch 132 to ground. Energization of the relay also effects closure of contacts 133 thereof which provide ground return for motor 116 described above. This effects energization of motor 116 which, when its armature has attained sufficient speed to engage clutch 117, winds the tape 109 on the reel 115 and thereby draws block 103 back to its normal position.

The switch 132 which provides the holding circuit for relay 130 is of the same sort as switch 125 and like the latter extends through a slot in carriage cover 101. However, switch 132 is so positioned that it is opened by the block when the same has been restored sufficiently for the latch 120 to lock the same in its normal position. Therefore, the relay 130 is deenergized to halt operation of motor 116 as soon as the block 103 has been restored to its normal position.

In order to prevent erroneous operations of the solenoids 90 (Fig. 10), as the reading heads 41 pass the dials 20 during restoration thereof to the left hand end of the calculator carriage (Fig. 11), the thyratrons 89 are disabled during that period. This is accomplished by connecting the second grid of each thyratron to ground through a resistor 89C and to a source of −20 volts potential through normally open front contacts 134 of relay 130, which it will be remembered is energized all during the restoration movement of the reading heads 41 and 81. Therefore, the contacts 134 are closed during that time and apply the low potential of −20 volts to the second grids of all of the thyratrons and prevent firing of the latter by positively directed pulses appearing at their control grids.

It has been found that satisfactory signals may be induced in the heads 41 and 81 by moving the same past the associated magnets at a speed of say 6 inches per second with a clearance or gap of a few thousandths of an inch between the heads and the magnets.

In some instances it may be desired to provide decimal point control means in addition to the means described hereinabove. For example, it may be desired to set a visual indicator to point out the location of the decimal point in the number represented by the dials 20 in the manner usual in calculating machines, and also to produce an electrical signal which may be used to control the operation of a typewriter solenoid, or the like, adapted to effect printing or other visual display of the decimal point of a number being read from the calculator dials. To this end, a decimal point reading head, not shown, may be included in the block 103 of Fig. 11 and may cooperate with a magnet similar to the sense magnets 82, which is positionable between any pair of dials 20. For example, a decimal point magnet may be slidably mounted on the side of the bar 107 which carries the magnets 82. The decimal point reading head may be provided with a playback circuit whose output may control the thyratron 89 for a solenoid 90 adapted to effect printing of a decimal point. In order to prevent operation of the decimal point solenoid during restoration of the block 103, the second grid of its thyratron may be connected in the same manner as described above in connection with the other thyratrons.

Other reading heads may be included in block 103 for cooperation with other magnets positioned differentially to control tabulation and the like, if such operations are desired.

It is to be mentioned that, if desired, the means of the invention may be arranged to read the dials 20, or other similar dials, in the reverse order to that described hereinabove, i. e., from right to left rather than left to right and also that other means, such as a worm drive may be used to move the block 103 back and forth. Further, the sense pulse magnets and the reading head associated therewith may be replaced by a suitable commutator or cam operated contacts synchronized with the movements of block 103.

It is also to be mentioned that known calculating machines include controls for effecting carriage shifts in either direction to the extent of one half of the digital columns represented by the dials which the means of the invention may be associated with. In such machines, the reading heads may be mounted in fixed position, either above the carriage or below it, and the carriage shifted by the existing controls to effect relative movement between the dials and the reading heads. However, as the carriage shifts through only half of the total dial spaces provided, only half of the dials can be sensed by a set of reading heads during each shift. In some instances this may be all that is desired. If, however, it is desired to sense all of the dials, two sets of reading heads may be utilized of which one set cooperates with the dials in the lower order half of the carriage and the other set cooperates with the dials in the upper order half of the carriage. In this arrangement the digit signals produced by the heads cooperating with the lower order dials are stored, for example, in a shift register, until all of the signals to be produced by the other set of heads have been transmitted to the indicator or display device to be controlled thereby, after which the stored signals are transmitted to the latter.

At this point, it is to be mentioned that whereas in the above description the indicator dials with which the means of the invention are associated are used to display decimal digits, the means of the invention are equally well adapted for use with dials which display other characters, for example, sterling amounts or alphabetical characters.

While there have been above described but a limited number of embodiments of the invention, many changes and modifications may be made therein without departing from the spirit of the invention and it is not desired, therefore, to limit the scope of the invention except as pointed out in the appended claims or as dictated by the prior art.

I claim:

1. The combination of a plurality of discs mounted on a common axis, each disc settable in a discrete number of rotational positions, a plurality of magnetic reading heads mounted to be concurrently adjacent the circumference of one of said discs, each of said discs having a plurality of bar magnets embedded beneath the periphery at selected locations thereof, said bar magnets being selectively orientated with their axes parallel to the axis of said discs, a plurality of other magnets mounted near said discs, one other magnet per disc, a magnetic sensing head mounted for cooperation with said other magnets, a carrier for said reading and sensing heads, means for moving said carrier in the direction along said common axis past said discs, a generator for producing sense pulses controlled by said sensing head, a playback circuit associated with each of said reading heads and controlled by said sense pulses for producing output signals indicative of the orientation of a bar magnet or of the absence of a bar magnet at the locations corresponding to said reading heads on said discs, and means for correlating the outputs of said playback circuits.

2. The combination according to claim 1 including means for restoring the head carrier after the same has been moved across the dials, a latch to retain this carrier in restored position and switch operated means for tripping the latch.

3. The combination according to claim 2 including a control circuit for the restoring means comprising a switch operated by the carrier when it has been moved across the dials, to effect activation of the restoring means and a second switch operated by the carrier when it has been restored by said means, to deactivate the latter.

4. The combination according to claim 3 and including disabling means made operative by the first said switch and made inoperative by the second said switch and means controlled selectively by the correlating means but disabled by the disabling means when the same is operative.

5. The combination according to claim 4 wherein each playback circuit includes a first circuit productive of an output signal on movement of the reading head past a dial magnet of one polarity, a second circuit productive of an output signal on movement of the reading head past a dial magnet of opposite polarity, and a third circuit controlled by the first and second circuits and productive of an output signal when both fail to produce said output signals.

6. The combination according to claim 5 wherein the signals induced in each reading head are sinusoidal waves having oppositely polarized first half cycles in accordance with the polarities of the magnets with which the reading head cooperates and where the sense pulses occur in coincidence with the peaks of the said first half cycles, and including means for amplifying the sinusoidal signals induced in the associated reading head and producing oppositely polarized rectangular pulses corresponding to the first and second half cycles of said signals and also a reference potential corresponding to the normal state of the means when it is not operating on a said sinusoidal signal, a pair of coincidence detectors, one controlled by the output of the amplifying means and the sense pulses, and the other controlled by the electronic inversion of the output of the amplifying means and by the sense pulses, means for inverting the outputs of the amplifying means for application to the second coincidence detector, the one detector producing an output signal on application thereto of a first half cycle rectangular pulse of one polarity and the other producing an output signal on application thereto of an inverted first half cycle pulse of opposite polarity, and a third coincidence detector controlled by the first two, and effective to produce an output signal when neither of the first two produces a said output signal.

7. The combination according to claim 6 wherein said correlating means comprises a diode matrix controlled differentially in accordance with the outputs of the coincidence detectors in each of the playback circuits and including a plurality of thyratrons operated selectively under control of the diode matrix.

8. The combination according to claim 7 wherein the disabling means comprises means for applying a bias to the thyratrons to maintain the same quenched.

9. The combination of a disc settable in a discrete number of rotational positions, a plurality of reading heads mounted to be concurrently adjacent the circumference of said disc, means for producing polarized magnetic fields surrounding selected locations on the circumference on said disc, means for effecting relative motion between said disc and said reading heads in the direction of the axis of said disc, said means for producing polarized magnetic fields being disposed so that each setting of said disc presents a different arrangement of magnetic fields to said plurality of reading heads, a plurality of playback circuits each controlled by one of said reading heads, each playback circuit including a first circuit productive of an output signal on relative movement between the associated reading head and a magnetic field of one polarity, a second circuit productive of an output signal on relative movement between the said associated reading head and a magnetic field of opposite polarity, and a third circuit controlled by the first and second circuits and productive of an output signal when both fail to produce said output signals, translating means controlled by the output signals from said plurality of playback circuits, and a plurality of output devices selectively controlled by said translating means.

10. The combination according to claim 9 wherein the translating means comprises a diode matrix controlled in accordance with the outputs from the first, second and third circuits in each of the playback circuits.

References Cited in the file of this patent

UNITED STATES PATENTS

| | | |
|---|---|---|
| 2,564,403 | May | Aug. 14, 1951 |
| 2,609,143 | Stibitz | Sept. 2, 1952 |
| 2,648,589 | Hickmen | Aug. 11, 1953 |
| 2,668,588 | Hamilton | Feb. 9, 1954 |
| 2,701,095 | Stibitz | Feb. 1, 1955 |